(12) United States Patent
Preem (10) Patent No.: US 12,139,237 B2
(45) Date of Patent: Nov. 12, 2024

(54) AIR SUPPLY SYSTEM FOR A HULL OF A VESSEL AND A VESSEL COMPRISING THE AIR SUPPLY SYSTEM

(71) Applicant: MAERSK A/S, Copenhagen K (DK)

(72) Inventor: Mikkel Preem, Ballerup (DK)

(73) Assignee: MAERSK A/S, Copenhagen K (DK)

( * ) Notice: Subject to any disclaimer, the term of this patent is extended or adjusted under 35 U.S.C. 154(b) by 66 days.

(21) Appl. No.: 18/028,981

(22) PCT Filed: Oct. 4, 2021

(86) PCT No.: PCT/EP2021/077249
§ 371 (c)(1),
(2) Date: Mar. 28, 2023

(87) PCT Pub. No.: WO2022/073908
PCT Pub. Date: Apr. 14, 2022

(65) Prior Publication Data
US 2023/0331349 A1 Oct. 19, 2023

(30) Foreign Application Priority Data
Oct. 9, 2020 (DK) .................................. 2020 70687

(51) Int. Cl.
*F02B 37/00* (2006.01)
*B63B 1/38* (2006.01)
*F02B 33/40* (2006.01)

(52) U.S. Cl.
CPC ................ *B63B 1/38* (2013.01); *F02B 33/40* (2013.01); *F02B 37/001* (2013.01); *B63B 2001/385* (2013.01); *B63B 2001/387* (2013.01)

(58) Field of Classification Search
CPC .. F02B 37/004; F02B 37/013; F02B 29/0412; B63B 1/38
See application file for complete search history.

(56) References Cited

U.S. PATENT DOCUMENTS

| 2007/0079612 A1 | 4/2007 | Grissom |
| 2014/0230430 A1* | 8/2014 | Krug .................... F02B 29/0412 60/273 |

(Continued)

FOREIGN PATENT DOCUMENTS

| EP | 2272747 A1 | 1/2011 |
| EP | 2930098 A1 | 10/2015 |

(Continued)

OTHER PUBLICATIONS

International Search Report and Written Opinion dated Feb. 8, 2022 for International Application No. PCT/EP2021/077249.

(Continued)

*Primary Examiner* — Ngoc T Nguyen
(74) *Attorney, Agent, or Firm* — EIP US LLP (57) ABSTRACT

Disclosed is an air supply system for supplying air to an outside of a hull of a vessel, the vessel holding a combustion engine. The air supply system comprises one or more air discharge units (ADUs) for releasing compressed air to an outside of the hull below a waterline of the vessel. The air supply system comprises a plurality of turbocharger(s) for supplying a compressed air flow to the combustion engine of the vessel via a first flow path. The plurality of turbochargers each comprises a turbine configured to be driven by an exhaust gas flow of the combustion engine and a compressor connected to the turbine and comprising an inlet for receiving air and an outlet for providing the compressed air flow to the first flow path. The plurality of turbochargers comprises a first turbocharger and a second turbocharger arranged in series with the compressor of the second turbocharger being downstream of the compressor of the first turbocharger in the first flow path. The air supply system comprises a first sub-path and a second sub-path branching off the first flow path and supplying the sub-flow of air to the ADUs. The first sub-path branches off from the first flow (Continued)

path downstream of the first turbocharger and upstream of the second turbocharger and wherein the second sub-path branches off from the first flow path downstream of both the first turbocharger and the second turbocharger.

10 Claims, 4 Drawing Sheets

(56) References Cited

U.S. PATENT DOCUMENTS

2016/0312687 A1  10/2016  Kemmerling et al.
2017/0218834 A1  8/2017  Kemmerling et al.

FOREIGN PATENT DOCUMENTS

| EP | 3054122 A1 | 8/2016 |
| JP | 2001048082 A | 2/2001 |
| JP | 2013193624 A | 9/2013 |
| WO | 2007040071 A1 | 4/2007 |
| WO | WO-2020192932 A1 * 10/2020 | ............... B63B 1/38 |

OTHER PUBLICATIONS

Denmark Technical Examination and Search Report dated Mar. 26, 2021 for Denmark Application No. PA202070687.

* cited by examiner

AIR SUPPLY SYSTEM FOR A HULL OF A VESSEL AND A VESSEL COMPRISING THE AIR SUPPLY SYSTEM

CROSS-REFERENCE TO RELATED APPLICATIONS

This application is a 371 of International Application No. PCT/EP2021/077249, filed Oct. 4, 2021, which claims priority to Danish Application No. PA 2020 70687 filed Oct. 9, 2020 under 35 U.S.C. § 119 (a). Each of the above-referenced patent applications is incorporated by reference in its entirety.

The present disclosure pertains to the field of propulsion of vessels. The present disclosure relates to an air supply system for supplying air to an outside of a hull of a vessel and a vessel comprising the air supply system.

BACKGROUND

A vessel's resistance when moving through water is made up of multiple components, of which frictional resistance is the most dominant. Injection of an air flow into a turbulent boundary layer around the hull of the vessel may be used to reduce the frictional resistance of the hull of the vessel in the water. The turbulent boundary layer is located between stationary water and the moving water close to the hull of the vessel.

Air lubrication of the hull can reduce the frictional loss significantly. Depending on the type of propulsion used for the vessel, an efficiency of the vessel may be drastically improved. The efficiency gain is dependent on speed, hull form, draft of the vessel and/or a distribution and amount of air to a wetted surface of the vessel. The draft of the vessel is the vertical distance from the bottom of a keel of the vessel to the waterline and the wetted surface is the total area of the vessels outer surface in contact with the surrounding water.

The total net efficiency improvement depends on the power used to pressurize the air flow required to reduce the friction. Hence, a net propulsion efficiency is dependent on the power required to facilitate the air flow and a given discharge pressure at an air outlet in the hull. The discharge pressure may correspond to the water pressure from the water surrounding the vessel acting on the air outlet ports.

SUMMARY

Traditional air lubrication systems typically use electric compressors to generate air flow to the outside of the vessel. However, these known electric compressors are expensive, require maintenance and may have poor efficiency.

Accordingly, there is a need for an air supply system for supplying air to an outside of a hull of a vessel, which mitigates, alleviates or addresses the shortcomings existing and provides a simpler and more efficient air supply system.

Disclosed is an air supply system for supplying air to an outside of a hull of a vessel is disclosed. The vessel comprises a combustion engine. The air supply system comprises one or more ADUs for releasing compressed air to the outside of the hull below a waterline of the vessel. The air supply system comprises a first turbocharger and a second turbocharger for supplying a compressed air flow to the combustion engine of the vessel via a first flow path, such as a scavenging air flow path. The first turbocharger and the second turbocharger each comprise a turbine configured to be driven by an exhaust gas flow of the combustion engine and a compressor connected to the turbine and comprising an inlet for receiving air and an outlet for providing the compressed air flow to the first flow path. The first turbocharger and the second turbocharger are arranged in series with the compressor of the second turbocharger being connected to and receiving compressed air from the first flow path downstream of the compressor of the first turbocharger in the first flow path. The air supply system comprises a first sub-path and a second sub-path branching off the first flow path and supplying the sub-flow of air to the ADUs. The first sub-path branches off from the first flow path downstream of the first turbocharger and upstream of the second turbocharger. The second sub-path branches off from the first flow path downstream of both the first turbocharger and the second turbocharger.

It is an advantage of the present disclosure that the efficiency of the air supply system is increased. Using two turbochargers arranged in series to compress the air to the ADUs provides a high compression ratio of the air supply system. This allows the pressure of the compressed air to overcome the discharge pressure at the ADUs at low loads, such as at exhaust flow rates below an exhaust gas flow threshold. The discharge of air through the ADUs may thus be started at an earlier engine load stage without the need of additional, dedicated compressors in the air supply system. At high loads, such as at exhaust flow rates above an exhaust gas flow threshold, the pressure of the compressed air provided by the first turbocharger is above the discharge pressure. The compressed air provided to the ADUs may thus be extracted via the first sub-path and the second turbocharger may be bypassed. Thereby the efficiency of the airs supply system may be further improved at high loads, since only one turbocharger has to be driven.

Disclosed is a vessel comprising the air supply system disclosed herein.

It is an advantage of the present disclosure that the net propulsion efficiency of the vessel is increased. Using two turbochargers arranged in series to compress the air to the ADUs provides a high compression ratio of the air supply system. This allows the pressure of the compressed air to overcome the discharge pressure at the ADUs at low loads, such as at exhaust flow rates below an exhaust gas flow threshold. The discharge of air through the ADUs and thus the reduction of the friction of the vessel in the water may thus be started at an earlier stage, such as at an earlier engine load stage, without the need of additional, dedicated compressors in the air supply system. At high loads, such as at exhaust flow rates above an exhaust gas flow threshold, the pressure of the compressed air provided by the first turbocharger is above the discharge pressure. The compressed air provided to the ADUs may thus be extracted via the first sub-path and the second turbocharger may be bypassed. Thereby the efficiency of the vessel may be further improved at high loads, since only one turbocharger has to be driven.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The figures are schematic and simplified for clarity, and they merely show details which aid understanding the disclosure, while other details have been left out. Throughout, the same reference numerals are used for identical or corresponding parts.

An air supply system for supplying air to an outside of a hull of a vessel is disclosed. The vessel comprises a combustion engine. The air supply system comprises one or more ADUs for releasing compressed air to the outside of the hull below a waterline of the vessel. The air supply system comprises a first turbocharger and a second turbocharger for supplying a compressed air flow to the combustion engine of the vessel via a first flow path, such as a scavenging air flow path. The first turbocharger and the second turbocharger each comprise a turbine configured to be driven by an exhaust gas flow of the combustion engine and a compressor connected to the turbine and comprising an inlet for receiving air and an outlet for providing the compressed air flow to the first flow path. The first turbocharger and the second turbocharger are arranged in series with the compressor of the second turbocharger being connected to and receiving compressed air from the first flow path downstream of the compressor of the first turbocharger in the first flow path. The air supply system comprises a first sub-path and a second sub-path branching off the first flow path and supplying the sub-flow of air to the ADUs. The first sub-path branches off from the first flow path downstream of the first turbocharger and upstream of the second turbocharger. The second sub-path branches off from the first flow path downstream of both the first turbocharger and the second turbocharger.

In one or more example air supply systems, the turbine of the first turbocharger may be arranged downstream of the turbine of the second turbocharger in an exhaust gas flow from the combustion engine. The exhaust gas flow from the combustion engine first enters the turbine of the second turbocharger before it enters the turbine of the first turbocharger. In some example air supply systems, the air supply system may comprise one or more bypass valves to bypass the second turbocharger, so that the exhaust gas flow may be fed to the turbine of the first turbocharger without having to pass the turbine of the second turbocharger.

In one or more example air supply systems, the second turbocharger is smaller, such as smaller in size, than the first turbocharger. The second turbocharger may for example be a small high-pressure turbocharger, such as a turbocharger configured to have a compression ratio higher than the first turbocharger. Since the compressed air from the first turbocharger occupies a smaller volume than the input air received by the first turbocharger, the second turbocharger is fed with a lesser volume of input air having a higher pressure and can therefore be smaller. By having the second turbocharger smaller than the first turbocharger the compressed air from the first turbocharger can be compressed into a higher pressure.

In one or more example air supply systems, the first sub-path comprises a first flow control device for controlling the air flow through the first sub-path and the second sub-path comprises a second flow control device for controlling the air flow through the second sub-path.

In one or more example air supply systems, the compressed air in the first flow path is scavenge air for the engine.

The compression ratio of the first and the second turbochargers may be selected based on the application, such as the pressure required to overcome the discharge pressure at the ADDs and/or the scavenging air pressure required.

In one or more example air supply systems, the first flow control device may be configured to allow a flow of compressed air through the first sub-path at high loads, such as when a load of the combustion engine is above a load threshold, such as when an exhaust gas flow to the turbochargers is above an exhaust gas flow threshold. The load threshold is the load at which the pressure of the compressed air flow overcomes the discharge pressure at the ADUs. The exhaust gas flow threshold may be the exhaust gas flow at which the first turbocharger generates a compressed flow with a pressure overcoming the discharge pressure at the ADUs. The first flow control device may be configured to prevent the flow through the first sub-path at low loads, such as when the load of the combustion engine is below the load threshold, such as when an exhaust gas flow to the turbochargers is below the exhaust gas flow threshold.

In one or more example air supply systems, the second flow control device is configured to allow a flow of compressed air through the second sub-path at low loads, such as when a load of the combustion engine is below a load threshold, such as when an exhaust gas flow to the turbochargers is below the exhaust gas flow threshold. The second flow control device may be configured to prevent the flow of compressed air through the second sub-path at high loads, such as when the load of the combustion engine is above the load threshold, such as when the exhaust gas flow to the turbochargers is above the exhaust gas flow threshold.

In a first operating mode, such as at low loads, air thus flows through both turbochargers, where it is compressed in two stages, before a sub-flow of compressed air is provided to the ADUs via the second sub-path. The compression ratio of the sub-flow of air supplied to the ADUs thus corresponds to the combined compression ratio of the first and the second turbocharger. Thereby, the boosting power of the air supply system is increased, so that the pressure of the compressed air flow overcomes the discharge pressure also at low loads.

In a second operating mode, such as at high loads, the compressed air from the first turbocharger may have a pressure sufficiently high to overcome the discharge pressure at the ADUs. The sub-flow of compressed air may thus be provided to the ADUs via the first sub-path. The second turbocharger may thus be bypassed. By bypassing the second turbocharger the efficiency of the air supply system and the net propulsion efficiency of the vessel is increased, since no losses occur over the second turbocharger.

In one or more example air supply systems, the first flow control device and/or the second flow control device comprises an orifice and/or a control valve.

The flow control device may in one or more example air supply systems be a fixed orifice, such as a fixed ratio orifice, configured to passively control the flow through the flow path. The fixed orifice may be configured to extract the sub-flow of air at a predetermined ratio to the flow of compressed air in the first flow path. The fixed orifice thus provides a simple and cost efficient for ensuring that only an sub-flow is extracted through the sub-paths which ensures that a sufficient amount of air remains in the first flow path and is provided to the combustion engine for cooling and for the combustion process in the combustion engine.

In one or more example air supply systems, the flow control device may be variable, such as being a control valve, such as a diaphragm control valve, which can actively control the amount of gas allowed to be extracted to the air supply system.

In one or more example air supply systems, the air supply system comprises a first air cooler for cooling of the compressed air flow from the first turbocharger and a second air cooler for cooling of the compressed air flow from the second turbocharger, wherein the first air cooler and the second air cooler are arranged in the first flow path and wherein the first sub-path is connected to the first flow path downstream of the first air cooler and wherein the second sub-path is connected to the first flow path downstream of the second air cooler.

In one or more example air supply systems, the air supply system comprises a water mist catcher for removing condensate from the compressed air flow, wherein the water mist catcher is arranged in the first flow path downstream of the second air cooler, and wherein the first sub-path and the second sub-path are connected to the first flow path upstream of the water mist catcher. Connecting the first and second sub-paths to the first flow path upstream of the water mist catcher prevents the compressed air extracted to the sub-flow paths from being contaminated by air from the combustion process in the engine escaping into the scavenging air receiver.

In one or more example air supply systems, the first flow path may comprise a non-return valve for preventing contaminated air from the combustion process in the engine to flow from the scavenging air receiver backwards towards through the first flow path. The water mist catcher may be arranged downstream of the second air cooler in the first flow path. The non-return valve may be arranged downstream of the water mist catcher in the first flow path.

In one or more example air supply systems, the air supply system may comprise an exhaust gas bypass valve for releasing exhaust gas in order to reduce the flow of exhaust gas to the first turbocharger and/or the second turbocharger. By reducing the exhaust gas flow to the first turbocharger and/or the second turbocharger, the turbochargers may be prevented from overrevving, which could otherwise cause damage to the turbochargers.

In one or more example air supply systems, the air supply system may comprise one or more controllers, such as control devices or units, for controlling the air supply system according to the example operating modes provided herein. The one or more controllers may receive information allowing the controller to control the air supply system according to the example operating modes provided herein. The information may comprise information received from a plurality of sensors, such as one or more pressure sensors measuring the discharge pressure at the ADUs, one or more pressure sensors measuring the pressure of the compressed air downstream of the first and/or a speed sensor of the vessel. The information may comprise information received from an engine control unit, such as information relating to a load of the engine.

A vessel comprising the air supply system is further disclosed. The vessel may further comprise an engine, such as a main engine, for propelling the vessel.

Figure 1:
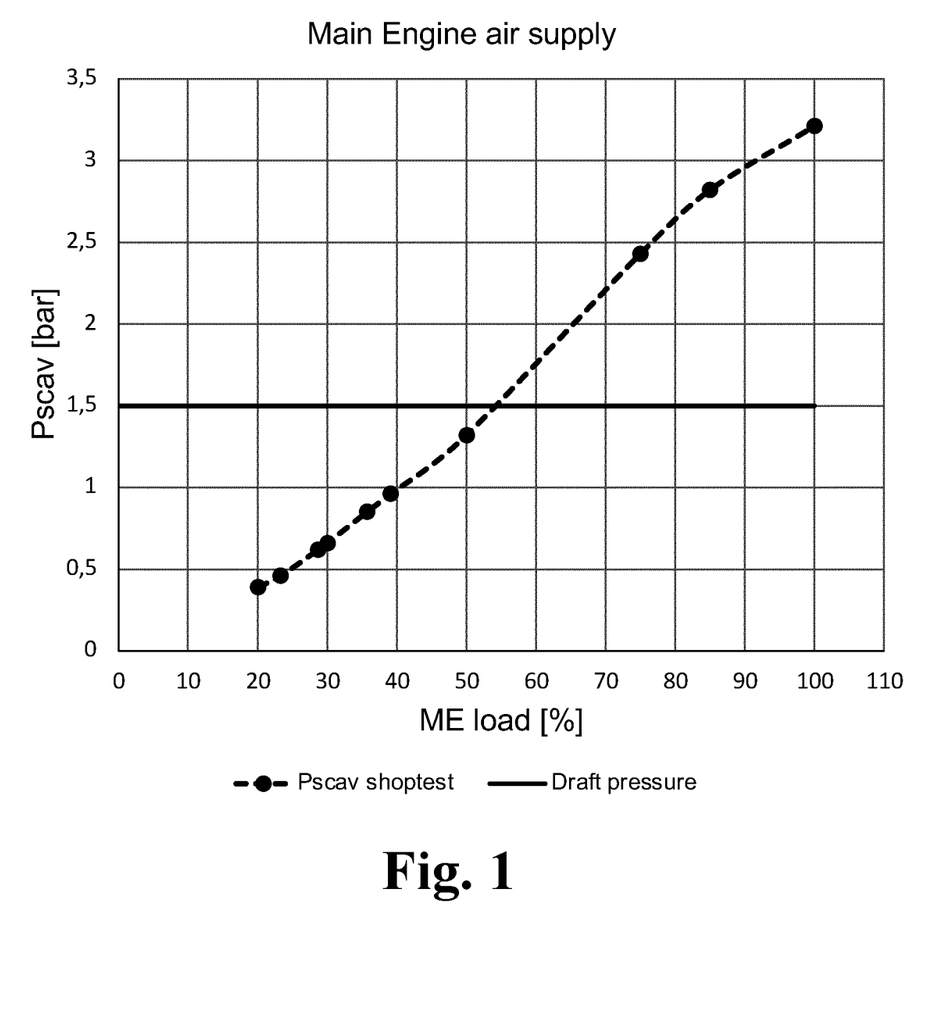
FIG. 1 illustrates a scavenging pressure and draft pressure as a function of engine load for a known example vessel.

FIG. 1 illustrates an example of a pressure of the compressed air provided by the one or more turbocharger(s), such as a scavenging air (Pscav), provided to the engine as a function of engine load. The discharge pressure at the ADUs is indicated by the draft pressure line in FIG. 1. The discharge pressure at the ADUs is dependent on their location on the hull. When the ADUs are arranged at the bottom of the hull, the discharge pressure corresponds to the draft pressure of the vessel. In order for air to be released to the outside of the hull of the vessel via the ADUs, the pressure of the compressed air has to overcome the discharge pressure at the ADUs. As can be seen in FIG. 1, the pressure of the compressed air is below the discharge pressure at the ADUs for engine loads below approximately 55%. This load may, for the example vessel shown in FIG. 1 be the load threshold. The exhaust gas flow threshold may be the exhaust gas flow generated by the combustion engine at the load where the compressed air generated by the first turbocharger overcomes the discharge pressure at the ADUs. For an air supply system using only compressed air provided by the turbochargers according to the example shown in FIG. 1, air would only be released at engine loads above 55%. In the following, an air supply system will be disclosed which allows a discharge of air to the outside of the hull of the vessel also at lower engine loads.

Figure 2:
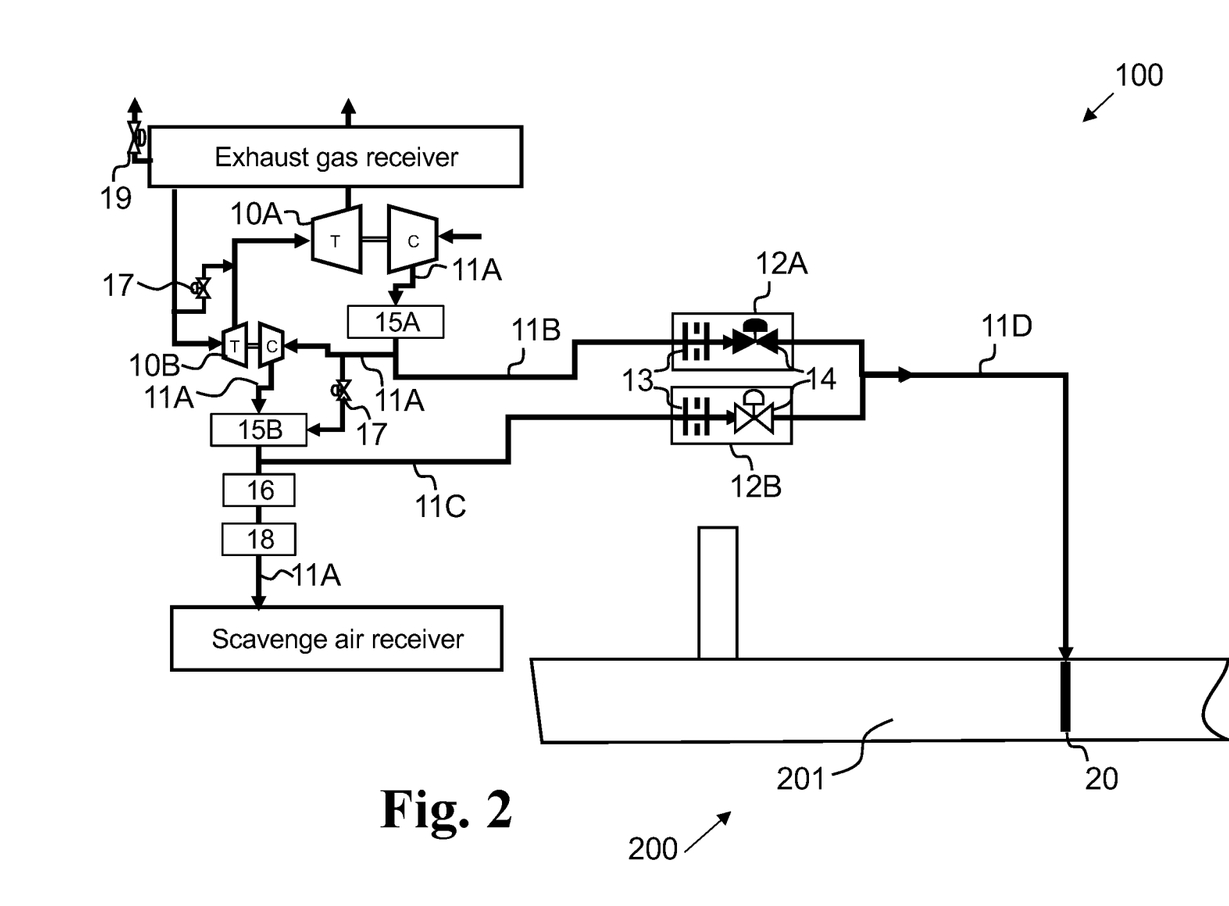
FIG. 2 illustrates an example air supply system according to this disclosure.

FIG. 2 illustrates an example air supply system 100 for supplying air to an outside of a hull 201 of a vessel 200 according to this disclosure. The vessel 200 holding a combustion engine. The air supply system 100 comprises one or more ADUs 20 for releasing compressed air to an outside of the hull 201 below a waterline of the vessel 200. The air supply system 100 comprises a first turbocharger 10A and a second turbocharger 10B for supplying a compressed air flow to the combustion engine of the vessel via a first flow path 11A. The first turbocharger 10A and the second turbocharger 10B each comprise a turbine T configured to be driven by an exhaust gas flow of the combustion engine and a compressor C connected to the turbine and comprising an inlet for receiving air and an outlet for providing the compressed air flow to the first flow path 11A. The first turbocharger 10A and the second turbocharger 10B are arranged in series. The compressor of the second turbocharger 10B is arranged downstream of the compressor of the first turbocharger 10A in the first flow path 11A. The first turbocharger 10A may receive ambient air through the inlet and may compress the ambient air before the compressed air is provided to the first flow path 11A through the outlet of the compressor C. The compressor of the second turbocharger 10B arranged downstream of the compressor of the first turbocharger 10A may receive compressed air from the first turbocharger as inlet air through its inlet. The second turbocharger 10B may further increase the pressure of the compressed air from the first turbocharger 10A. The air supply system 100 further comprises a first sub-path 11B and a second sub-path 11C branching off the first flow path 11A and supplying the sub-flow of air to the ADUs 20, wherein the first sub-path 11B branches off from the first flow path 11A downstream of the first turbocharger 10A and upstream of the second turbocharger 10B and wherein the second sub-path 11C branches off from the first flow path 11A downstream of both the first turbocharger 10A and the second turbocharger 10B. The first sub-path 11B and the second sub-path 11C may merge into a common sub-path 11D downstream of their respective branching points. The turbine T of the first turbocharger 10A is arranged downstream of the turbine T of the second turbocharger 10B in an exhaust gas flow from the combustion engine. The exhaust gas flow from the combustion engine thus first enters the turbine T of the second turbocharger 10B before it enters the turbine T of the first turbocharger 10A. In some example air supply systems 100, the air supply system 100 may comprise one or more bypass valves 17 to bypass the second turbocharger, so that the exhaust gas flow may be fed to the turbine of the first turbocharger 10A without having to pass the turbine of the second turbocharger 10B and/or the compressed air flow may flow through the first flow path 11A without passing the second turbocharger 10B. The second turbocharger 10B may be smaller than the first turbocharger 10A. The second turbocharger 10B may for example be a small high-pressure turbocharger, such as a turbocharger configured to have a compression ratio higher than the first turbocharger 10A. The first turbocharger may be a larger low-pressure turbocharger, such as a turbocharger configured to have a compression ratio lower than the second turbocharger 10B. Small herein refers to the actual size of the second turbocharger 10B in relation to the first turbocharger 10A. The second turbocharger 10B may e.g. have a smaller turbine wheel, compressor wheel, turbine housing and/or compressor housing than the first turbocharger and may thus allow a smaller flow through the second turbocharger than through the first turbocharger. Since the compressed air from the first turbocharger 10A occupies a smaller volume than the input air received by the first turbocharger 10A, the second turbocharger 10B is fed with a lesser volume of input air having a higher pressure and can therefore be smaller. By having the second turbocharger 10B smaller than the first turbocharger 10A the compressed air from the first turbocharger 10A can be compressed into an even smaller volume with a higher pressure.

The first sub-path 11B may comprise a first flow control device 12A for controlling the air flow through the first sub-path 11B. The second sub-path 11C may comprise a second flow control device 12B for controlling the air flow through the second sub-path 11C. The first flow control device 12A and/or the second flow control device 12B may comprise an orifice 13 and/or a control valve 14. The air supply system 100 may further comprise a first air cooler 15A for cooling of the compressed air flow from the first turbocharger 10A and/or a second air cooler 15B for cooling of the compressed air flow from the second turbocharger 10B. The first air cooler 15A and the second air cooler 15B may be arranged in the first flow path 11A. The first sub-path 11A may be connected to the first flow path 11A downstream of the first air cooler 15A. The second sub-path 11C may be connected to the first flow path 11A downstream of the second air cooler 15B. The example air supply system 100 may further comprises a water mist catcher 16 for removing condensate from the compressed air flow. The water mist catcher 16 may be arranged in the first flow path 11A downstream of the second air cooler 15B. The first sub-path 11B and the second sub-path 11C may be connected to the first flow path 11A upstream of the water mist catcher 16. The first flow path 11A may comprise a non-return valve 18 for preventing contaminated air from the combustion process in the engine to flow from the scavenging air receiver backwards towards through the first flow path 11A. The water mist catcher 16 may be arranged downstream of the second air cooler 15B in the first flow path 11A. The non-return valve 18 may be arranged downstream of the water mist catcher 16 in the first flow path 11A. In order to prevent the turbocharger from overrevving, the air supply system 100 may comprise an exhaust gas bypass valve 19 for releasing exhaust gas in order to reduce the flow of exhaust gas to the first turbocharger 10A and/or the second turbocharger 10B.

The air supply system 100 may be comprised in the vessel 200. The vessel 200 comprises a hull 201 and may further comprise an engine.

Figure 3:
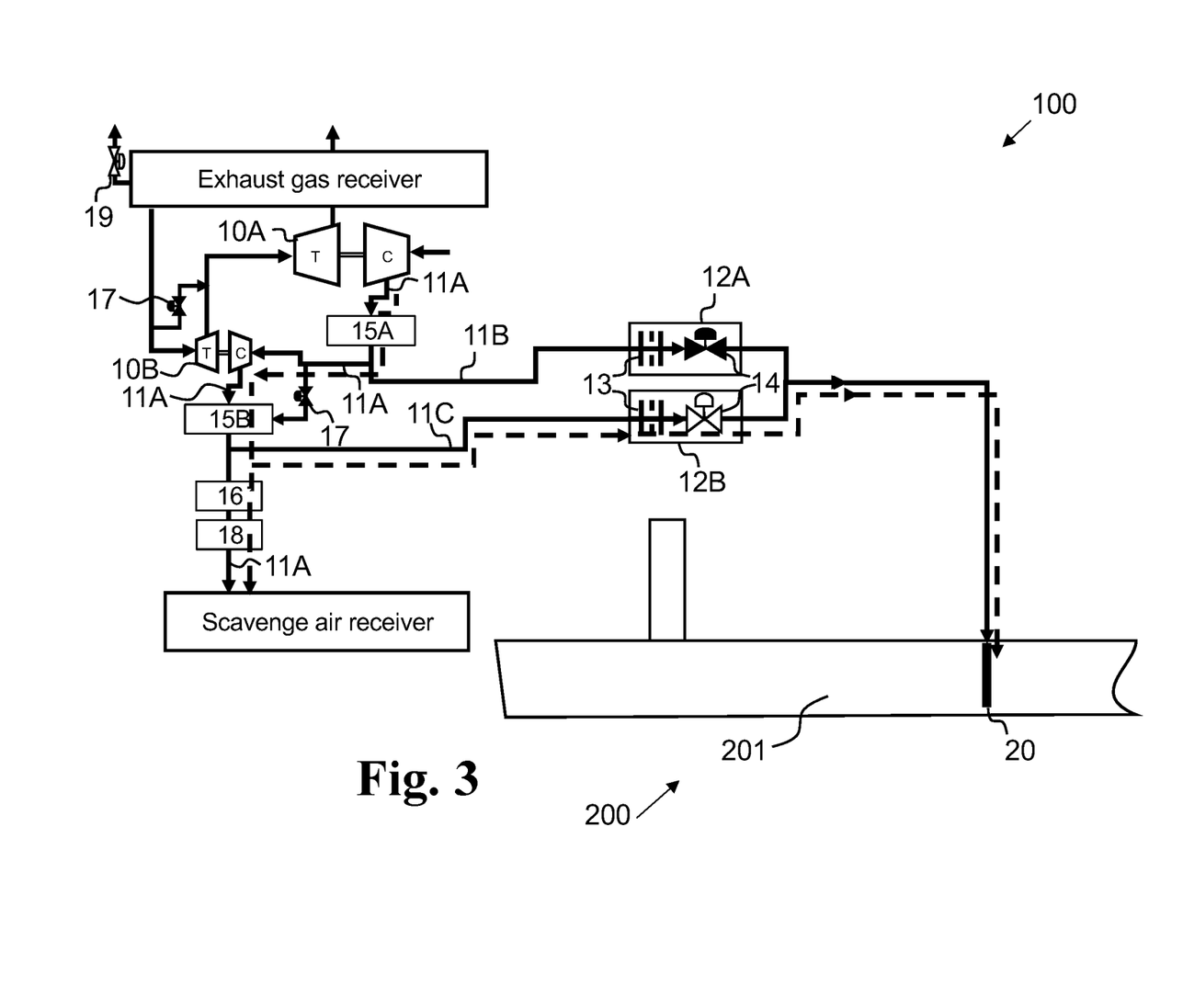
FIG. 3 illustrates a first operating mode for an example air supply system according to this disclosure.

FIG. 3 illustrates the example air supply system of FIG. 2 in a first operating mode. The first operating mode is a low load mode, such as when the exhaust gas flow is below an exhaust gas flow threshold, such as when the engine is operating at a load below a load threshold. The compressed air in the first flow path 11A may be scavenge air for the engine. In this first operating mode, the first flow control device 12A is configured to prevent the flow of compressed air through the first sub-path 11B. The second flow control device is configured to allow a flow of compressed air through the second sub-path 11C. In other words, the first control device 12A, such as a first control valve, is closed (indicated by the black valve 14A), and the second flow control device 12B, such as a second control valve, is opened (indicated by the white valve 14). Ambient air flows through the first turbocharger 10A where the air is compressed. Due to the low load operation, the compression of the air flow in the first turbocharger 10A may not be sufficient to overcome the discharge pressure at the ADUs 20. The compressed air flow from the first turbocharger 10A is then fed to the second turbocharger 10B where the compressed air flow is compressed further. After the second compression the pressure of the compressed air exceeds the discharge pressure. The sub-flow of compressed air, at a pressure above the discharge pressure, is then extracted from the first flow path 11A via the second sub-path 11C and provided to the ADUs 20 via the third sub-path 11D. The flow of the compressed air in the current operating mode is shown by the dashed line in FIG. 3. By feeding the air through both turbochargers 10 prior to extracting the sub-flow of compressed air through second sub-path 11C a rapid ramp-up of boost pressure is achieved. Thereby, the pressure ratio of the combination of turbochargers 10A, 10B is increase. The pressure of the sub-flow of compressed air will thus overcome the discharge pressure earlier, such as at lower loads, so that the discharge of air through the ADUs 20 and the reduction of the friction of the vessel in the water can be activated earlier. During this operating mode the bypass valves 17 may be closed (indicated by the black bypass valves 17).

Figure 4:
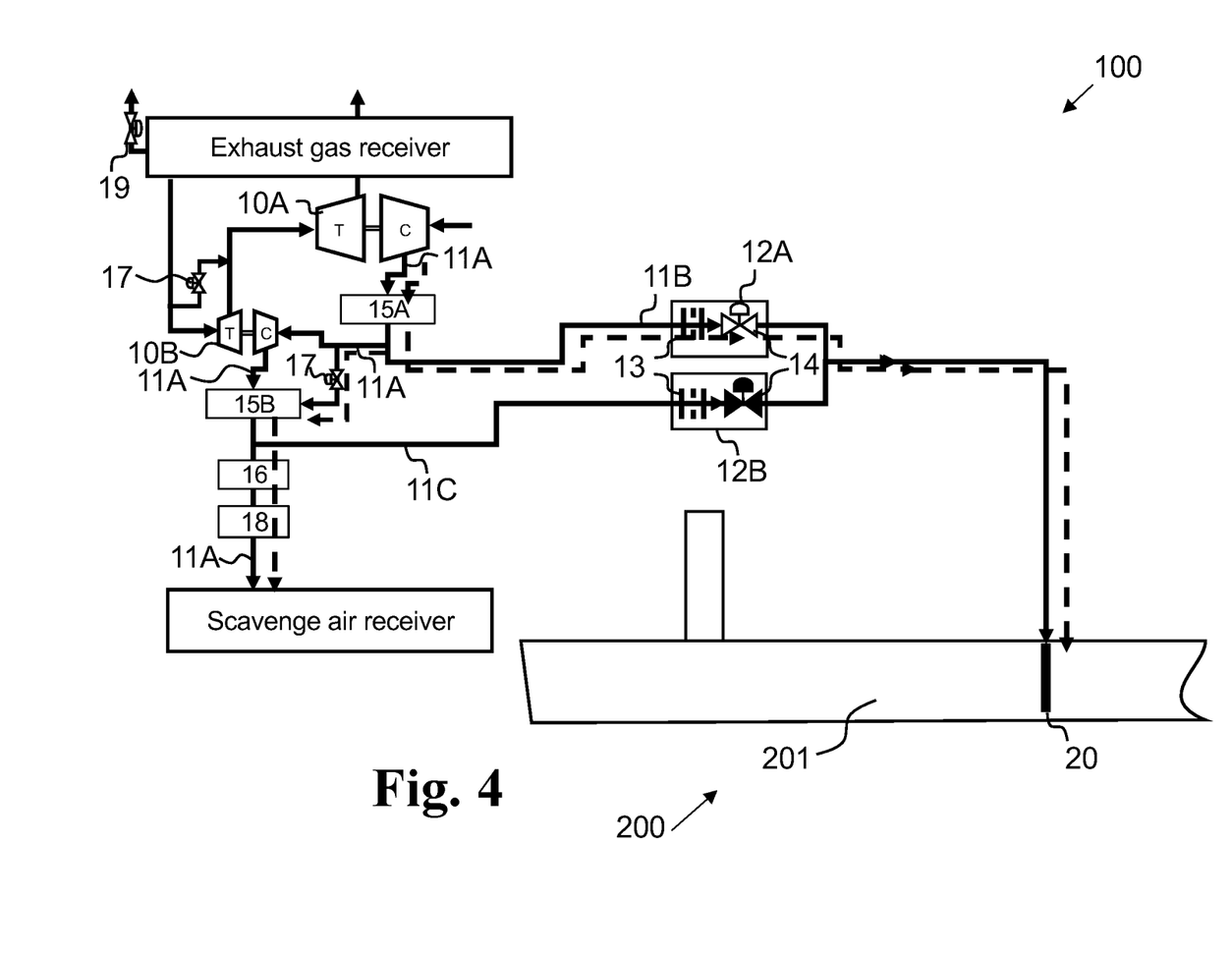
FIG. 4 illustrates a second operating mode for an example air supply system according to this disclosure.

FIG. 4 illustrates the example air supply system of FIG. 2 in a second operating mode. The second operating mode is a high load mode, such as when the exhaust gas flow is above an exhaust gas flow threshold, such as when the engine is operating at a load above a load threshold. The compressed air in the first flow path 11A may be scavenge air for the engine. In this second operating mode, the first flow control device 12A is configured to allow the flow of compressed air through the first sub-path 11B. The second flow control device 12B is configured to prevent the flow of compressed air through the second sub-path 11C. In other words, the first control device 12A, such as a first control valve, is open (indicated by the white valve 14), and the second flow control device 12B, such as a second control valve, is closed (indicated by the white valve 14). Ambient air flows through the first turbocharger 10A where the air is compressed. Due to the high load operation, such as due to the higher flow of exhaust gas through the turbines of the turbochargers 10, the compression of the air flow in the first turbocharger 10A is sufficient to increase the pressure of the compressed air to above the discharge pressure at the ADUs 20. The sub-flow of compressed air is thus extracted from the first flow path 11A via the first sub-path 11B and provided to the ADUs 20 via the third sub-path 11D. The flow of the compressed air in the current operating mode is shown by the dashed line in FIG. 4. By feeding the air through both turbochargers 10 prior to extracting the sub-flow of compressed air through second sub-path 11C a rapid ramp-up of boost pressure is achieved. Thereby, the pressure of the sub-flow of compressed air will overcome the discharge pressure earlier, such as at lower loads, so that the discharge of air through the ADUs 20 and the reduction of the friction of the vessel in the water can be activated earlier. In the second operating mode, where the first turbocharger produces sufficient pressure of the air flow to overcome the discharge pressure, the second turbocharger 10B may be bypassed so that all of the exhaust gas and/or the compressed air flow is flows directly via the first turbocharger 10A. The second turbocharger 10B may be bypassed by opening the bypass valves 17 (as indicated by the white bypass valves 17). By bypassing the second turbocharger 10B, the efficiency of the air supply system may be improved, since no energy has to be used for driving the second turbocharger 10B.

Embodiments of products (air supply system and vessel) according to the disclosure are set out in the following items:

Item 1. An air supply system (100) for supplying air to an outside of a hull (201) of a vessel (200), the vessel (200) holding a combustion engine, the air supply system (100) comprising:
one or more air discharge units, ADUs, (20) for releasing compressed air to an outside of the hull (201) below a waterline of the vessel (200),
a first turbocharger (10A) and a second turbocharger (10B) for supplying a compressed air flow to the combustion engine of the vessel via a first flow path (11A), the first turbocharger (10A) and the second turbocharger (10B) each comprising a turbine (T) configured to be driven by an exhaust gas flow of the combustion engine and a compressor (C) connected to the turbine and comprising an inlet for receiving air and an outlet for providing the compressed air flow to the first flow path (11A), wherein the first turbocharger (10A) and the second turbocharger (10B) are arranged in series with an inlet of the compressor of the second turbocharger (10B) being connected to and receiving compressed air from the first flow path (11A) downstream of the compressor of the first turbocharger (10A) in the first flow path (11A), and
a first sub-path (11B) and a second sub-path (11C) branching off the first flow path (11A) and supplying the sub-flow of air to the ADUs (20), wherein the first sub-path (11B) branches off from the first flow path (11A) downstream of the first turbocharger (10A) and upstream of the second turbocharger (10B) and wherein the second sub-path (11C) branches off from the first flow path (11A) downstream of both the first turbocharger (10A) and the second turbocharger (10B).

Item 2. The air supply system (100) according to Item 1, wherein the turbine (T) of the first turbocharger (10A) is arranged downstream of the turbine (T) of the second turbocharger (10B) in an exhaust gas flow from the combustion engine.

Item 3. The air supply system (100) according to any one of the previous Items, wherein the second turbocharger (10B) is smaller than the first turbocharger (10A).

Item 4. The air supply system (100) according to any one of the previous Items, wherein the first sub-path (11B) comprises a first flow control device (12A) for controlling the air flow through the first sub-path (11B) and the second sub-path (11C) comprises a second flow control device (12B) for controlling the air flow through the second sub-path (11C).

Item 5. The air supply system (100) according to Item 4, wherein the compressed air in the first flow path (11A) is scavenge air for the engine, and wherein the first flow control device (12A) is configured to allow a flow of compressed air through the first sub-path (11B) when a load of the combustion engine is above a load threshold and to prevent the flow through the first sub-path (11B) when the load of the combustion engine is below the load threshold.

Item 6. The air supply system (100) according to any one of Items 4 or 5, wherein the compressed air in the first flow path (11A) is scavenge air for the engine and wherein the second flow control device (12B) is configured to allow a flow of compressed air through the second sub-path (11C) when a load of the combustion engine is below a load threshold and to prevent the flow through the second sub-path (11C) when the load of the combustion engine is above the load threshold.

Item 7. The air supply system (100) according to any one of Items 4 to 6, wherein the first flow control device (12A) and/or the second flow control device (12B) comprises an orifice (13) and/or a control valve (14).

Item 8. The air supply system (100) according to any one of the previous Items, wherein the air supply system (100) comprises a first air cooler (15A) for cooling of the compressed air flow from the first turbocharger (10A) and a second air cooler (15B) for cooling of the compressed air flow from the second turbocharger (10B), wherein the first air cooler (15A) and the second air cooler (15B) are arranged in the first flow path (11A) and wherein the first sub-path (11A) is connected to the first flow path (11A) downstream of the first air cooler (15A) and wherein the second sub-path (11C) is connected to the first flow path (11A) downstream of the second air cooler (15B).

Item 9. The air supply system (100) according to Item 8, wherein the air supply system (100) comprises a water mist catcher (16) for removing condensate from the compressed air flow, wherein the water mist catcher (16) is arranged in the first flow path (11A) downstream of the second air cooler (15B), and wherein the first sub-path (11B) and the second sub-path (11C) are connected to the first flow path (11A) upstream of the water mist catcher (16).

Item 10. A vessel (200) comprising the air supply system according to any one of the Items 1 to 9.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It is to be noted that the word "comprising" does not necessarily exclude the presence of other elements or steps than those listed.

It is to be noted that the words "a" or "an" preceding an element do not exclude the presence of a plurality of such elements.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly to be regarded in an illustrative rather than restrictive sense. The claimed disclosure is intended to cover all alternatives, modifications, and equivalents.

What is claimed is:

1. An air supply system for supplying air to an outside of a hull of a vessel, the vessel holding a combustion engine, the air supply system comprising:
   one or more air discharge units, ADUs, for releasing compressed air to an outside of the hull below a waterline of the vessel,
   a first turbocharger and a second turbocharger for supplying a compressed air flow to the combustion engine of the vessel via a first flow path, the first turbocharger and the second turbocharger each comprising a turbine configured to be driven by an exhaust gas flow of the combustion engine and a compressor connected to the turbine and comprising an inlet for receiving air and an outlet for providing the compressed air flow to the first flow path, wherein the first turbocharger and the second turbocharger are arranged in series with an inlet of the compressor of the second turbocharger being connected to and receiving compressed air from the first flow path downstream of the compressor of the first turbocharger in the first flow path, and
   a first sub-path and a second sub-path branching off the first flow path and supplying a sub-flow of air to the ADUs, wherein the first sub-path branches off from the first flow path downstream of the first turbocharger and upstream of the second turbocharger and wherein the second sub-path branches off from the first flow path downstream of both the first turbocharger and the second turbocharger.

2. The air supply system according to claim 1, wherein the turbine of the first turbocharger is arranged downstream of the turbine of the second turbocharger in an exhaust gas flow from the combustion engine.

3. The air supply system according to claim 1, wherein the second turbocharger is smaller than the first turbocharger.

4. The air supply system according to claim 1, wherein the first sub-path comprises a first flow control device for controlling the air flow through the first sub-path and the second sub-path comprises a second flow control device for controlling the air flow through the second sub-path.

5. The air supply system according to claim 4, wherein the compressed air in the first flow path is scavenge air for the engine, and wherein the first flow control device is configured to allow a flow of compressed air through the first sub-path when a load of the combustion engine is above a load threshold and to prevent the flow through the first sub-path when the load of the combustion engine is below the load threshold.

6. The air supply system according to claim 4, wherein the compressed air in the first flow path is scavenge air for the engine and wherein the second flow control device is configured to allow a flow of compressed air through the second sub-path when a load of the combustion engine is below a load threshold and to prevent the flow through the second sub-path when the load of the combustion engine is above the load threshold.

7. The air supply system according to claim 4, wherein the first flow control device and/or the second flow control device comprises an orifice and/or a control valve.

8. The air supply system according to claim 1, wherein the air supply system comprises a first air cooler for cooling of the compressed air flow from the first turbocharger and a second air cooler for cooling of the compressed air flow from the second turbocharger, wherein the first air cooler and the second air cooler are arranged in the first flow path and wherein the first sub-path is connected to the first flow path downstream of the first air cooler and wherein the second sub-path is connected to the first flow path downstream of the second air cooler.

9. The air supply system according to claim 8, wherein the air supply system comprises a water mist catcher for removing condensate from the compressed air flow, wherein the water mist catcher is arranged in the first flow path downstream of the second air cooler, and wherein the first sub-path and the second sub-path are connected to the first flow path upstream of the water mist catcher.

10. A vessel comprising the air supply system according to claim 1.

* * * * *